United States Patent

Arnt

Patent Number: 5,274,928
Date of Patent: Jan. 4, 1994

[54] COMPASS MOUNTING APPARATUS

[75] Inventor: Stanley L. Arnt, Watervliet, Mich.

[73] Assignee: Michigan Outdoor Products, Inc., Watervliet, Mich.

[21] Appl. No.: 70,490

[22] Filed: Jun. 2, 1993

Related U.S. Application Data

[63] Continuation of Ser. No. 972,144, Nov. 5, 1992, abandoned.

[51] Int. Cl.$^5$ .............................................. G01C 17/04
[52] U.S. Cl. .................................. 33/352; 33/334; 33/347
[58] Field of Search ................. 33/352, 351, 333, 334, 33/347, 349, 350, 354, 275

[56] References Cited

U.S. PATENT DOCUMENTS

| | | | |
|---|---|---|---|
| 399,449 | 3/1889 | Taylor | 33/334 |
| 1,611,886 | 12/1926 | Champlin | 33/334 |
| 2,237,963 | 4/1941 | Hawks | 33/334 |
| 2,331,616 | 10/1943 | Minghetti | 33/334 |
| 2,653,390 | 9/1953 | White et al. | 33/334 |
| 4,033,045 | 7/1977 | Wing | 33/275.6 |
| 4,402,140 | 9/1983 | Nagate | 33/334 |

Primary Examiner—William A. Cuchlinski, Jr.
Assistant Examiner—C. W. Fulton
Attorney, Agent, or Firm—Flynn, Thiel, Boutell & Tanis

[57] ABSTRACT

A combination of a compass and a connective arrangement for facilitating connection of the compass to a firearm or other portable object. The connective arrangement includes a one or two part elongated and hollow sleeve having an interior opening therein opening outwardly at opposite first and second ends. A housing containing the compass works is received in the first end of the sleeve. The interior opening at the second end of the sleeve has an internal thread threadedly secured to an externally threaded screw to thereby facilitate the connection of the compass works containing housing to the firearm or other portable object.

16 Claims, 4 Drawing Sheets

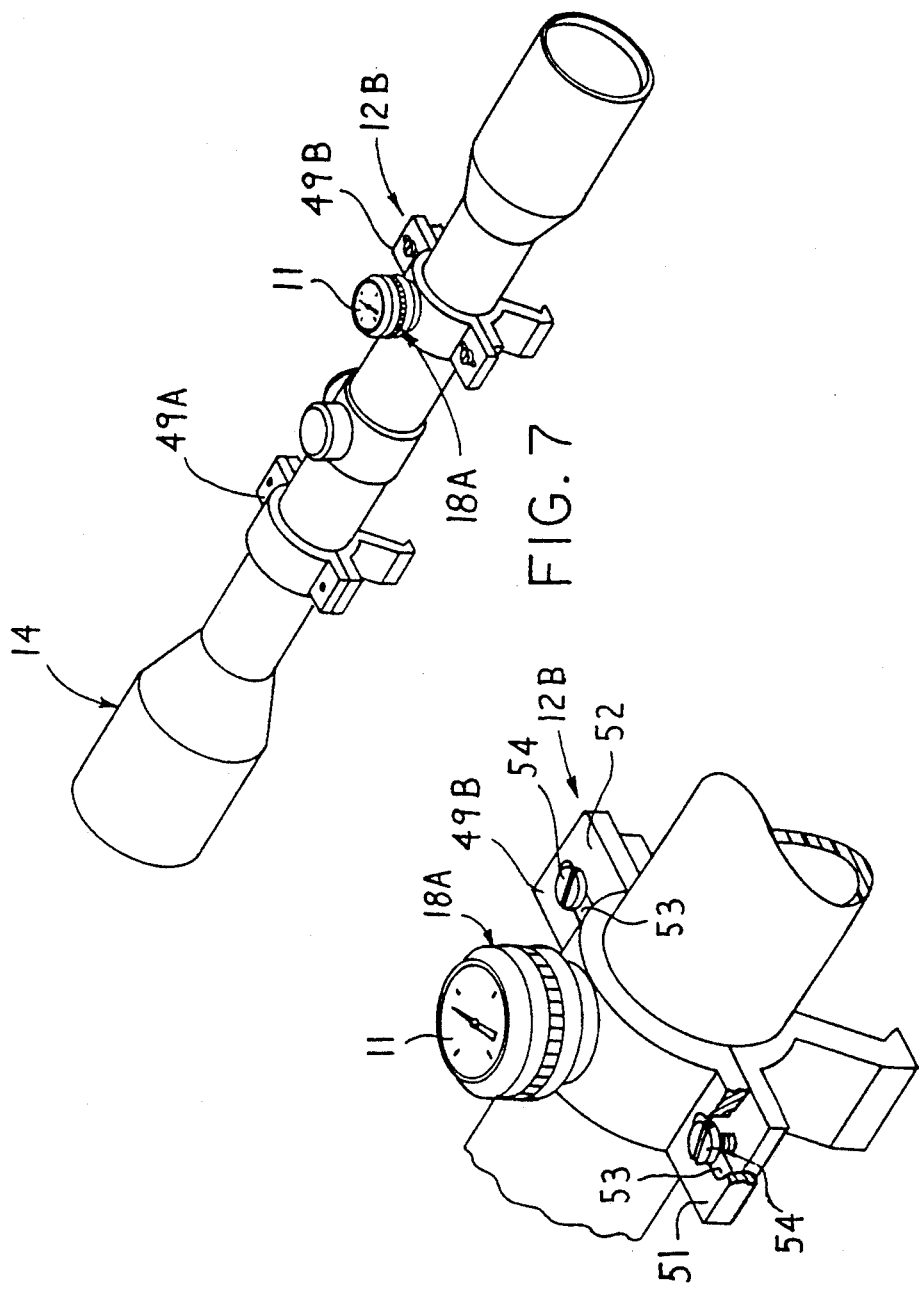

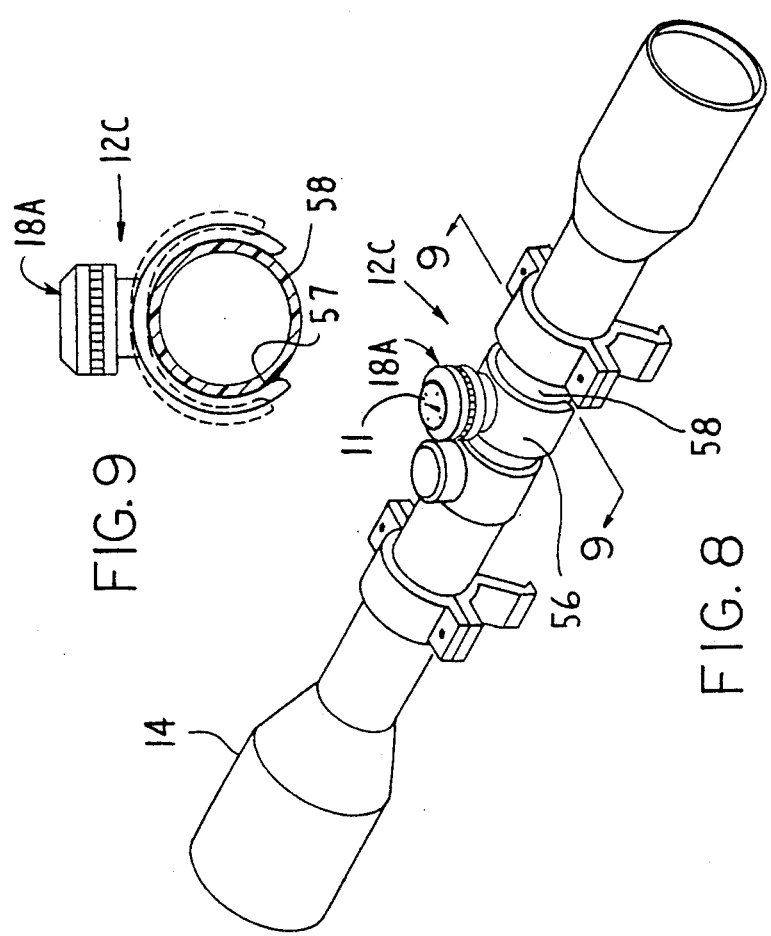

COMPASS MOUNTING APPARATUS

This application is a continuation-in-part of U.S. Ser. No. 07/972,144, filed Nov. 5, 1992, now abandoned.

FIELD OF THE INVENTION

This invention relates to a combination compass and a connective arrangement for mounting the compass to a firearm of other portable object. This invention arose out of desire to fulfill a need in the sport of hunting. Therefore, the following disclosure will relate to a sue of the invention with firearms. It is to be understood, however, that the invention is capable of a use with other portable objects and, therefore, is not to be limited to a use solely with firearms.

BACKGROUND OF THE INVENTION

Hunters hunting in a strange territory often lose their sense of direction and are unable to find their way back to the point from which they started. As a result, it has been found to be advantageous to provide a compass on a gun so that the compass will be readily available to the hunter at all times. One example of a gun mounted compass is illustrated in U.S. Pat. No. 2,653,390. However, orienting the compass at the very end of the gun stock is not always convenient for the hunter to view the compass.

Normally, when a hunter moves about the terrain, the gun is usually held in a horizontal position ready to be quickly brought up to the shoulder and fired should game suddenly appear within range. In this ready position, the butt end of the gun stock is not readily visible to the hunter.

Accordingly, it is an object of this invention to provide a connective arrangement for connecting a compass onto a firearm so that the compass will be readily visible to the hunter at all times during a movement about the terrain that is being hunted.

It is a further object of the invention to provide a connective arrangement, as aforesaid, which is attachable to an existing piece of structure on the mounting structure for a telescopic gun sight mounted on a firearm and without requiring any modification to the existing structure of the firearm with telescopic gun sight.

It is a further object of the invention to provide a bracket attachable to a firearm, which bracket has the requisite connective arrangement thereon to facilitate a mounting of the compass to the bracket.

It is a further object of the invention to provide a connective arrangement, as aforesaid, which is weather tolerant.

SUMMARY OF THE INVENTION

The objects and purposes of the invention have been met by providing a combination of a compass and a connective arrangement for facilitating connection of the compass to a firearm or other portable object. The connective arrangement includes a one or two part elongated and hollow sleeve having an interior openign therein opening outwardly at opposite first and second ends. A housing containing the compass works is received in the first end of the sleeve. The interior opening at the second end of the sleeve has an internal thread threadedly secured to an externally threaded screw to thereby facilitate the connection of the compass works containing housing to the firearm or other portable object.

BRIEF DESCRIPTION OF THE DRAWINGS

Other objects and purposes of the invention will become apparent to persons of ordinary skill in the art upon reading the following specification and inspecting the accompanying drawings, in which:

FIGS. 6 and 7 are an isometric view of a third embodiment of a compass mounting;

FIG. 8 is an isometric view of a fourth embodiment of a compass mounting; and

FIG. 9 is a sectional view taken along the line 9—9 of FIG. 8.

DETAILED DESCRIPTION

Figure 1:
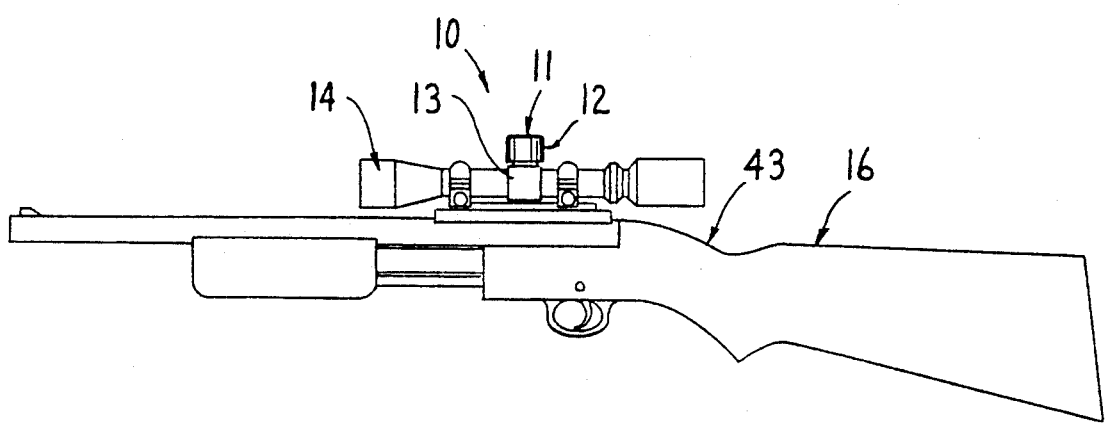
FIG. 1 is a side elevational view of the combination compass and connective arrangement for facilitating a mounting of the compass onto a mounting structure for a telescopic gun sight on a firearm.

FIG. 1 illustrates a combination 10 of a compass 11 and a connective arrangement 12 for facilitating a securement of the compass to an existing mounting device 13 which effects a mounting of a telescopic gun sight 14 to a firearm 16. The mounting device 13 is secured to the firearm 16 by conventional and, therefore, not discussed structure. The mounting device 13 usually includes an externally exposed, externally threaded screw member 17 for facilitating an adjustment of the gun sight of the telescope 14 in a Vertical plane. A similar and not illustrated externally exposed screw is also provided for facilitating an adjustment of a gun sight in a horizontal plane perpendicular to the aforementioned vertical plane. A slot 18 exists for facilitating the use of a tool, such as a screwdriver, for rotating the screw 17 either clockwise or counterclockwise to facilitate the aforesaid adjustment of the gun sight in the vertical plane. The screw 17 is usually provided on the top side of the mounting device 13. A protective cap (not illustrated) is usually provided for covering the screw 17 to protect the screw from the effects of the environment.

The connective arrangement 12 includes an elongated and hollow sleeve 18 made of a moldable synthetic resin material and which has a circular interior opening 23, 27 therein and opening outwardly at opposite ends 19 and 21. In this particular embodiment, a barrier wall 22 located about midlength of the sleeve 18 separates the opposite ends 19 and 21 from one another. The circular interior opening 23 opening outwardly of the sleeve at the end 19 is internally threaded as at 24, the internal thread 24 matching the external thread 26 on the screw 17. The circular interior opening 27 opening outwardly at the end 21 is generally smooth and unobstructed. A compass works containing housing 28 of the compass 11 includes a base wall 29, a circular boundary wall 31 connected to and upstanding from the base wall and a transparent wall 32 (FIG. 3) connected to the circular wall 31 to define a sealed chamber in which is located the compass works which is visible through the transparent window 32. The compass works containing housing 28 is received into the opening 27 with the base wall 29 resting on the barrier wall 22, the transparent window 32 facing outwardly of the opening 27. In this particular embodiment, the dimension of the circular wall 31 of the compass works containing housing 28 is congruent with the dimension of the opening 27, the usual clearance space being provided for facilitating insertion of the housing 28 into the opening 27.

An exterior surface of the sleeve 18 adjacent the end 21 includes an external thread 33. An inverted cup-shaped cap 34 is provided, the top wall 36 of which has an opening 37 therethrough. The side wall 38 of the cap 34 includes an internal thread as at 39 matching the external thread 33 so as to facilitate a threaded engagement with the external thread 33. In this particular embodiment, an annular O-ring type seal 41 is provided between the end 21 and an inside facing surface of the top wall 36 of the cup-shaped cap 34 to seal any gap that may exist between the circular wall 31 of the compass works containing housing 28 and the interior surface of the opening 27. Screwing the cap 34 on tightly will compress the seal 41 between the end 21 of the sleeve 18 and the inwardly facing surface of the top wall 36.

Figure 3:
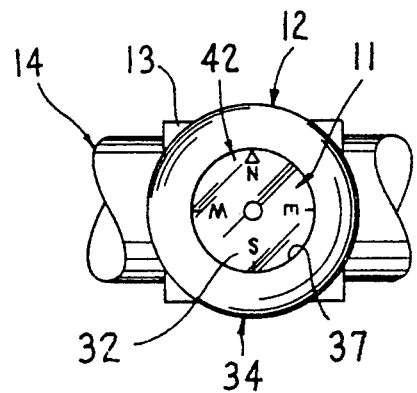
FIG. 3 is an enlarged top view of FIG. 2.

In use, when it is desired to mount a compass onto the mounting device 13 for the telescope 14, all that needs to be done is to remove the protective cap protecting the screw 17 and screw the sleeve 18 via the internal thread 24 thereof onto the external thread 26 of the screw 17. The compass works 42 as shown in FIG. 3 is rendered visible through the opening 37 in the cap 34. Since the compass is oriented midlength of the firearm 16, the hunter will likely cradle the firearm in the arms so as to keep the gun in a generally horizontally aligned position such as is illustrated in FIG. 1 ready for use. Thus, the compass works 32 will always be visible to the hunter as the hunter moves about the terrain.

ALTERNATE CONSTRUCTIONS

Figure 2:
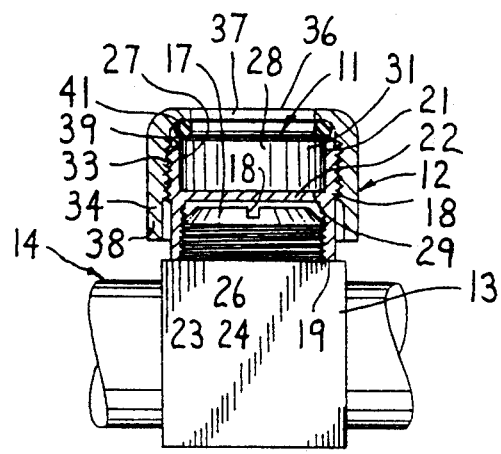
FIG. 2 is an enlarged, partially sectioned, side view of a fragment of FIG. 1.
Figure 4:
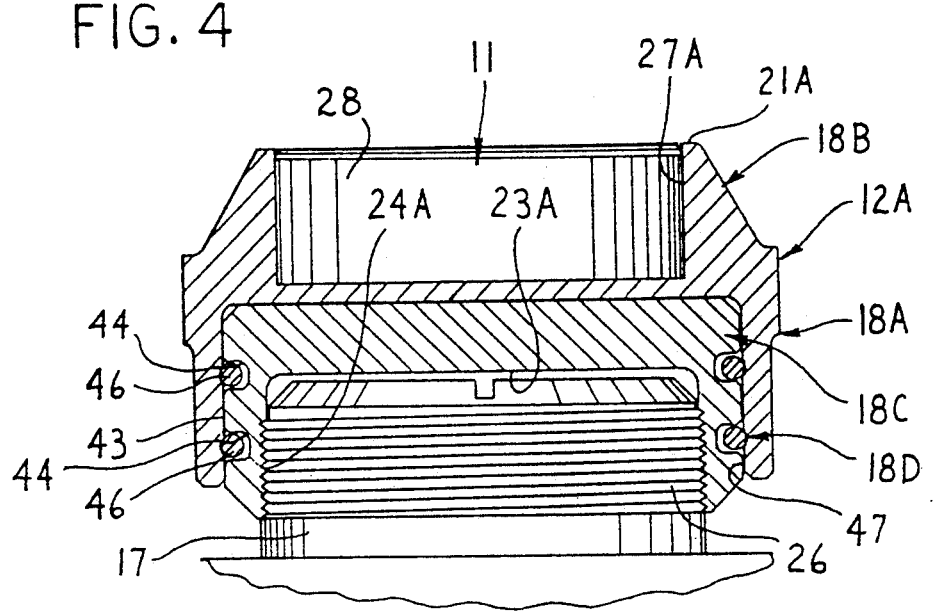
FIG. 4 is an enlarged central crosssectioned illustration of a second embodiment of a compass mounting.
Figure 5:
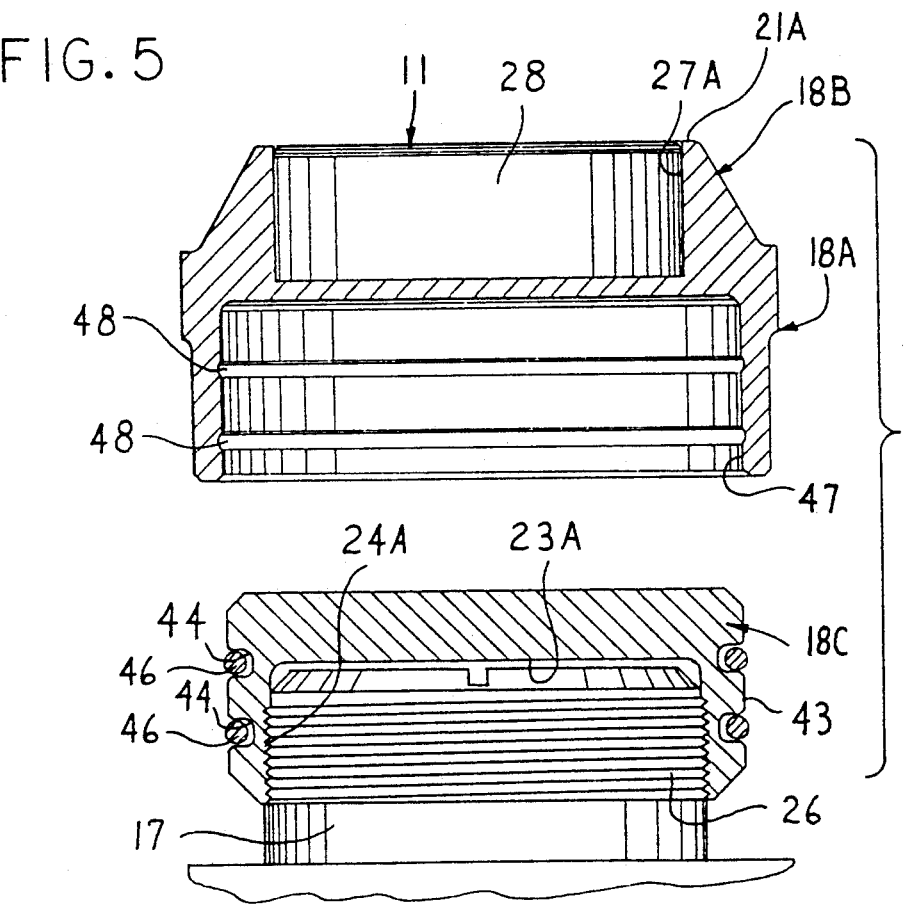
FIG. 5 is a view similar to FIG. 4, but with the compass mounting parts being separated from one another.

FIGS. 4 and 5 illustrate a second embodiment of a connective arrangement 12A which facilitates a connection of a compass onto a portable object, such as a firearm. The modified connective arrangement 12A includes an elongated hollow sleeve 18A which is comprised of two parts 18B and 18C adapted to be releasably connected to one another by a fastening mechanism 18D. More specifically, the sleeve part 18C is generally an upside down cup-shaped part having a recess or interior opening 23A and an internal thread 24A, the internal thread 24A matching the external thread 26 on the vertically upstanding screw 17 illustrated in FIG. 2. The radially exterior surface 43 of the sleeve part 18C includes at least one, but preferably a pair of annular grooves 44 each having an elastically yieldable spring clip 46 therein. The diameter of the circular spring clip 46 is adjusted so that a radially outermost portion of each spring clip projects beyond the radial exterior surface 43 and yet be capable of a contraction into the grooves 44 to orient the aforesaid radially exterior surface to a location recessed from the exterior surface 43.

The sleeve part 18B includes a circular interior opening 27A opening outwardly at the end 21A. The compass works containing housing 28 of the compass 11 is received in the opening 27A. The end of the sleeve part 18B remote from the aforesaid end 21A includes a further circular interior opening 47 which conforms to and is adapted to receive therein the sleeve part 18C with normal clearance therebetween. The interior wall surface of the opening 47 has at least one, but preferably a pair of annular grooves 48 therein which are aligned with the grooves 44. When the sleeve part 18B is mounted onto the sleeve part 18C, the radially outermost portion of the spring clips 46 is received in the grooves 48 to cause the sleeve part 18C to be releasably secured to the sleeve part 18B. In other words, the spring clips serve as a fastening mechanism for releasably securing the sleeve part 18B to the sleeve part 18C. It is also conceivable to make the interior wall surface of the opening 47 without grooves (i.e., smooth). In this instance, a single spring clip 46 could be provided in a groove 44 to frictionally engage the interior wall surface 47 with sufficient force to operatively hold the sleeve parts 18B and 18C together. To separate the sleeve parts, the spring clip would slide along the smooth interior wall surface 47 and eventually out of engagement with the interior wall surface to enable the aforesaid separation to take place.

In this particular embodiment, the sleeve parts 18B and 18C are made of a nonmagnetic metal, such as aluminum. These parts could also be made of a moldable synthetic resin material. In some instances, the directional indication of the compass will be altered by metal components on the object to which the compass is mounted. In these instances, it would be desirable to remove the compass from the object so that a correct compass reading can be acquired. The releasable fastening mechanism afforded by the spring clips 46 will enable the sleeve part 18B to be removed from the sleeve part 18C so that the compass 11 housed therein can be moved with the sleeve part 18B to a location remote from any metal components on the object to which the sleeve part 18C is secured. Following the acquisition of an accurate compass reading, the sleeve part 18B can be returned to its mounting on the sleeve part 18C. FIG. 5 illustrates the sleeve part 18B removed from the sleeve part 18C.

FIGS. 6 and 7 illustrate a third embodiment of a connective arrangement 12B, FIG. 6 being an enlargement of the illustration in FIG. 7. In this particular embodiment, the rightmost one of the conventional clamping components, such as a component corresponding to part 49A in FIG. 7 on the leftmost clamp, is substituted with a clamping component 49B, which clamping component has a vertically upstanding externally threaded screw thereon identical to the screw 26 described in the embodiment illustrated in FIG. 2. The connective arrangement 12B also includes a mounting of the sleeve 18A (or 18) onto the aforesaid screw in a manner identical to that described above. Thus, further discussion with respect to a securement of a compass works to the clamping component 49B is believed to b e unnecessary.

The clamping component 49B also has a pair of legs 51 and 52 corresponding to the legs on the component 49A, which legs each have an elongated slot 53 therein to accommodate the reception of a fastener 54 therein. The elongated slot 53 will facilitate various lateral spacings between the fasteners 54 on conventionally available clamping mechanisms for clamping the telescope 14 to a firearm.

FIGS. 8 and 9 illustrate a fourth embodiment of a connective arrangement 12C for facilitating the connection of a compass to an object, such as the telescopic gun sight 14 adapted to be mounted onto a firearm 16 as illustrated in FIG. 1. In this particular embodiment, the connective arrangement 12C includes a generally C-shaped clip 56 made of an elastically yieldable material, such as a hard plastic, the legs of the clip being elastically yieldable between the solid line position illustrated in FIG. 9 wherein the clip snugly engages the cylindrical exterior surface 58 of the telescopic gun sight 14 and the broken line position enabling the clip 56 to be removed or inserted onto the telescopic gun sight 14. In this situation, the interior surface 57 of the clip 56 has a radius that is equal to or just slightly less than a radius of a circular cylindrical exterior surface 58 of the gun sight 14. The spring clip 56 is adapted to facilitate a capture of the exterior surface of the gun sight with a sufficient clamping force to keep a vertically upright, externally threaded screw, corresponding to the screw 26 illustrated in FIG. 2, fixedly oriented relative to the gun sight. The sleeve 18A (or 18) is mounted onto the aforesaid screw in a manner that has been sufficiently described above.

Although particular preferred embodiments of the invention have been disclosed in detail for illustrative purposes, it will be recognized that variations or modifications of the disclosed apparatus, including the rearrangement of parts, lie within the scope of the present invention.

I claim:

1. A combination of a compass and a connective arrangement, said compass including a compass works containing housing having a base wall, a boundary wall connected to and upstanding from said base wall and a transparent window connected to said boundary wall to define a sealed chamber in which is located the compass works which is visible through the transparent window, said connective arrangement including a connecting means for securing said compass to a telescope mount mounted on a firearm, said telescope mount including at least one exposed vertically oriented externally threaded adjusting screw on atop side of the telescope, said connecting means including an elongated and hollow sleeve having an interior opening therein opening outwardly at opposite first and second ends, said housing being received in said first end with said boundary wall thereof being congruent with said interior opening, said transparent window facing outwardly of said sleeve, said interior opening at said second end of said sleeve having an internal thread threadedly secured to said externally threaded adjusting screw to thereby enable said connecting means to cover and protect said exposed adjusting screw from the effects of the environment, an external surface of said first end of said sleeve having an external thread thereon, and an internally threaded cap having means defining a hole through an end wall thereof threaded onto said external thread on said sleeve so that the compass works is visible through the hole, said a seal between a perimeter region of the hole and a perimeter region of said transparent window to prevent moisture from entering said first end.

2. The combination according to claim 1, wherein said boundary wall is circular, and wherein said interior opening is circular.

3. The combination according to claim 2, wherein said circular interior openings of said first and second ends are separated by a moisture impermeable barrier wall.

4. The combination according to claim 1, wherein said connecting means is made of a moldable synthetic resin material.

5. A combination of a compass and a connective arrangement, said compass including a compass works containing housing having a base wall, a boundary wall connected to and upstanding from said base wall and a transparent window connected to said boundary wall to define a sealed chamber in which is located the compass works which is visible through the transparent window, said connective arrangement including a connecting means for securing said compass to a telescope mount mounted on a firearm, said telescope mount including at least one exposed vertically oriented externally threaded adjusting screw on a top side of the telescope, said connecting means including an elongated and hollow sleeve having an interior opening therein opening outwardly at opposite first and second ends, said first and second ends being separated by a moisture impermeable barrier wall, said housing being received in said first end with said boundary wall thereof being congruent with said interior opening, said transparent window facing outwardly of said sleeve, said interior opening at said second end of said sleeve having an internal thread threadedly secured to said externally threaded adjusting screw to thereby enable said connecting means to cover and protect said exposed adjusting screw from the effects of the environment.

6. The combination according to claim 5, wherein said connecting means is made of a moldable synthetic resin material.

7. The combination according to claim 5, wherein said boundary wall is circular, and wherein said interior openings are circular.

8. A combination of a compass and a connective arrangement, said compass including a compass works containing housing having a base wall, a boundary wall connected to and upstanding from said base wall and a transparent window connected to said boundary wall to define a sealed chamber in which is located the compass works which is visible through the transparent window, said connective arrangement including first and second connecting means for securing said compass to a portable object, said first connecting means including at lest one vertically upstanding, externally threaded screw, said second connecting means including an elongated and hollow sleeve having an interior opening therein opening outwardly at opposite first and second ends, said first and second ends being separated by means defining a moisture impermeable barrier wall, said compass works containing housing being received in said first end with said transparent window facing outwardly of said sleeve, said interior opening at said second end of said sleeve having an internal thread threadedly secured to said externally threaded screw.

9. The combination according to claim 8, wherein said elongated and hollow sleeve includes first and second parts, said first part having a first interior opening therein at said first end and receiving said compass works containing housing therein, said second part having a second internal opening therein at said second end and having said internal thread therein, said elongated and hollow sleeve further including a releasable coupling means for releasably coupling said first and second parts together.

10. The combination according to claim 9, wherein first and second parts are telescopically connected, one over the other, to define a radial space therebetween, and wherein said releasable coupling means includes means defining a radially movable spring clip means mounted between said first and second parts and on one of said first and second parts, the other of said first and second parts having means defining a recess receiving therein said spring clip means, said spring clip means elastically yielding to a force tending to separate said first and second parts to cause a radial movement of said spring clip means out of said recess to enable a separation of said first and second parts.

11. The combination according to claim 9, wherein first and second parts are telescopically connected, one over the other, to define a radial space therebetween, and wherein said releasable coupling means includes means defining a radially movable spring clip means mounted between said first and second parts and on one of said first and second parts, the other of said first and second parts having surface means operatively engaging said spring clip means to hold said first and second parts together, said spring clip means yielding to a force tending to separate said first and second parts to cause said spring clip means to slide out of engagement with said surface means to enable a separation of said first and second parts.

12. The combination according to claim 8, wherein said first connecting means includes a base having mounting means thereon for facilitating a connection of said base to said portable object, said base having said at least one vertically upstanding, externally threaded screw thereon.

13. The combination according to claim 12, wherein said elongated and hollow sleeve includes first and second parts, said first part having a first interior opening therein at said first end and receiving said compass works containing housing therein, said second part having a second interior opening therein at said second end and having said internal thread therein, said elongated and hollow sleeve further including a releasable coupling means for releasably coupling said first and second parts together.

14. The combination according to claim 12, wherein first and second parts are telescopically connected, one over the other, to define a radial space therebetween, and wherein said releasable coupling means includes means defining a radially movable spring clip means mounted between said first and second parts and on one of said first and second parts, the other of said first and second parts having means defining a recess receiving therein said spring clip means, said spring clip means elastically yielding to a force tending to separate said first and second parts to cause a radial movement of said spring clip means out of said recess to enable a separation of said first and second parts.

15. The combination according to claim 12, wherein said portable object is a telescopic gun sight and said mounting means effects a mounting of said gun sight to a firearm; wherein said mounting means includes a pair of clamping members and fastening means therefor for clamping said gun sight therebetween, one of said clamping members having said at least one vertically upstanding, externally threaded screw thereon.

16. The combination according to claim 12, wherein said portable object is a telescopic gun sight and said mounting means effects a mounting of said gun sight to a firearm; wherein said mounting means includes a generally C-shaped slip made of an elastically yieldable material, an interior surface of said clip having an internal surface with a radius that is equal to or slightly less than a radius of a circular cylindrical exterior surface of said gun sight, said clip being adapted to elastically yield to facilitate a capture of said exterior surface of said gun sight with a sufficient clamping force to keep said screw fixedly oriented relative to said gun sight.

* * * * *

UNITED STATES PATENT AND TRADEMARK OFFICE
CERTIFICATE OF CORRECTION

PATENT NO. : 5 274 928
DATED : January 4, 1994
INVENTOR(S) : Stanley L. Arnt It is certified that error appears in the above-identified patent and that said Letters Patent is hereby corrected as shown below:

```
Column 5, line 35; change "atop" to ---a top---.
          line 52; change "said" to ---and---.

Column 6, line 37; change "lest" to ---least---.
          line 54; change "internal" to ---interior---.

Column 8, line 26; change "slip" to ---clip---.
```

Signed and Sealed this

Thirty-first Day of May, 1994

*Attest:*

BRUCE LEHMAN

*Attesting Officer*   *Commissioner of Patents and Trademarks*